United States Patent
Koch et al.

(10) Patent No.: US 7,559,383 B2
(45) Date of Patent: Jul. 14, 2009

(54) HARD MATERIAL DRILLING HEAD

(75) Inventors: Olaf Koch, Kaufering (DE); Karl-Heinz Hofmann, Weil (DE)

(73) Assignee: Hilti Aktiengesellschaft, Schaan (LI)

( * ) Notice: Subject to any disclaimer, the term of this patent is extended or adjusted under 35 U.S.C. 154(b) by 103 days.

(21) Appl. No.: 11/800,485

(22) Filed: May 4, 2007

(65) Prior Publication Data
US 2008/0121437 A1 May 29, 2008

(30) Foreign Application Priority Data
May 10, 2006 (DE) .................. 10 2006 000 221

(51) Int. Cl.
*E21B 10/43* (2006.01)
(52) U.S. Cl. .................. 175/431; 175/415
(58) Field of Classification Search .................. 175/430, 175/414, 420, 420.1, 401, 426, 428, 385, 175/387, 388, 392, 403, 404
See application file for complete search history.

(56) References Cited

U.S. PATENT DOCUMENTS

| | | | | |
|---|---|---|---|---|
| 4,294,319 A | * | 10/1981 | Guergen | 175/389 |
| 6,129,162 A | * | 10/2000 | Hauptmann | 175/394 |
| 6,702,047 B2 | * | 3/2004 | Huber | 175/427 |
| 6,843,334 B2 | * | 1/2005 | Schautt | 175/430 |
| 7,001,120 B2 | * | 2/2006 | Moser et al. | 408/225 |
| 2001/0013430 A1 | * | 8/2001 | Hauptmann et al. | 175/415 |
| 2002/0108789 A1 | | 8/2002 | Schautt | |
| 2005/0205306 A1 | * | 9/2005 | Miyanaga | 175/323 |
| 2005/0274551 A1 | * | 12/2005 | Batliner et al. | 175/414 |
| 2006/0032675 A1 | | 2/2006 | Koch et al. | |
| 2006/0243496 A1 | | 11/2006 | Widmann | |

FOREIGN PATENT DOCUMENTS

WO   WO 01/08840 A1 * 2/2001

* cited by examiner

*Primary Examiner*—David J Bagnell
*Assistant Examiner*—James G Sayre
(74) *Attorney, Agent, or Firm*—Abelman, Frayne & Schwab

(57) ABSTRACT

A solid hard material head for a percussion drilling tool rotatable about a rotational axis (A) in a rotational direction (ω), includes at least one main bit and at least one auxiliary bit (5), circumferentially offset relative to the at least one main bit (3) and having an auxiliary cutting edge (6) formed, at least piecewise, as a circular arc section (7) spaced from the rotational axis (A) radially inwardly and inclined in a radial direction, and a straight outer section (8) extending radially outwardly with respect to the circular arc section (7) and inclined in the radial direction.

15 Claims, 2 Drawing Sheets

HARD MATERIAL DRILLING HEAD

BACKGROUND OF THE INVENTION

1. Field of the Invention

The present invention relates to a hard material drilling head for a percussion drilling tool, in particular, for a rotary-percussion drill for drilling stone material and having a diameter from 4 mm to 40 mm that is used with a rotary-percussion hand-held power tool. The present invention also relates to a rotary-percussion hand-held power tool equipped with the percussion drilling tool with a hand material drilling head.

2. Description of the Prior Art

Usually, contemporary high-loaded percussion drilling tools for stone materials have a compact solid hard material head with two main and two auxiliary bits and which is mounted on the tool shaft end. In addition to supporting the cutting function of the main bits, the auxiliary bit or bits serve for improving a drilling tool behavior upon hitting the reinforcing metal. Because of a long service life of modern solid hard material head, as uniform as possible drilling capacity of the drilling tool over the period the tool is used, is required. In particular, with new solid hard material heads with still very sharp bits, the sliding friction should not be substantially higher than in a middle of a preset use time period.

International Publication WO 01 088 40 discloses a solid hard material head with three main bits the cutting edges of which are formed of extending from outside inward, a straight outer section and a circular arc section, with the straight outer section being inclined in the radial direction and with the circular arc section extending radially up to the drill tip.

German Publication DE 10 117 262 discloses a compact solid hard material head for a percussion drilling tool having two, diametrically opposite main bits and two diametrically opposite auxiliary bits and in which auxiliary bits, which are arranged, in the rotational direction (at an acute angle) circumferentially in front of the respective main bits, have cutting edges, respectively, extending exactly tangentially.

The tangentially extending cutting edges provide for a reliable lifting of the drilling head, upon the drill striking a reinforcement metal, before the main bits engage the ductile reinforcing metal and can be severely damaged.

European Publication EP 16 047 93 discloses a cross-shaped solid hard material head for a percussion drilling tool with two, arranged diametrically opposite each other, main bits and two, likewise arranged diametrically opposite each other, auxiliary bits which have each an auxiliary cutting edge in form of a circular arc section that is spaced from the rotational axis radially inwardly and extends radially outwardly exacting radially.

An object of the present invention is a solid hard material head having an increased service file.

Another object of the present invention is a solid hard material head having a reduced friction in a new condition.

SUMMARY OF THE INVENTION

These and other objects of the present invention, which will become apparent hereinafter are achieved by providing a solid had material head for a percussion drilling tool rotatable about a rotational axis in a rotational direction and including at least one main bit having a main cutting edge, and at least one auxiliary bit, circumferentially offset relative to the at least one main bit and having an auxiliary cutting edge formed, at least piecewise, as a circular arc section spaced from the rotational axis radially inwardly and inclined in a radial direction, and having a straight outer section extending radially outwardly with respect to the circular arc section and inclined in the radial direction.

The straight outer section of the auxiliary cutting edge that is inclined radially outwardly provides a cutting edge that extends radially outwardly exactly radially and the friction of which is substantially reduced. In addition, the drillings are removed radially due to the rotation of the tool.

Advantageously, the auxiliary cutting edge ends, radially inwardly at a distance from the rotational axis, in an axial recess. Thereby, the axial recess forms a bridge (viewing in the rotational direction) to a drillings removing groove provided in front of an associated main bit and through which the drillings are removed.

Advantageously, the auxiliary cutting edge forms, radially inwardly, a straight inner section extending up to the axial recess whereby an advantageous end inclination over the extent of the inner section is maintained.

Advantageously, the straight outer section and the circular arc section and, when provided, the straight inner section smoothly pass into each other (i.e., without steps). Thereby, the transitional regions (viewed in the rotational direction), do not form either local hook-forming outer necks or drillings accumulating inner necks.

Advantageously, the circular arc section is curved in a direction opposite the rotational direction. Thereby, the auxiliary cutting edge has, over its extent in the radially inward direction, increased tangential components along which reinforcing metal, when encountered, can slide substantially without friction.

Advantageously, the straight outer section and the circular arc section and, when provided, the straight inner section are inclined, along an entire course of the auxiliary cutting edge radially inwardly in a direction opposite the rotational direction. Thereby, the drillings, which are accumulated at the auxiliary cutting edge, are transported radially inwardly.

Advantageously, the outer angle of the straight outer section (measured in the axial plane relative to the radii) is in a range from 2° to 15°, whereby an optimal friction behavior is achieved.

Advantageously, the end angle of the inner straight section (measured in the axial plane relative to an associated main bit) is in a range from 60° to 85° and, advantageously, is equal to 65°. Thereby, a smaller amount of drillings can be clamped between the bits, which reduces the thermal load during drilling process.

Advantageously, a run-on ratio (measured in the axial plane relative to an associated main bit) between a radial length of the axial recess and the main cutting edge is in range between 0.2 and 0.5. This provides for an accurate drilling into the material without slipping off.

Advantageously, the wedge angle of the auxiliary bit (measured in the tangential plane) is in a range from 95° to 125°, preferably, is equal to 110°, which insures an optimal behavior, when a reinforcing metal is hit.

Advantageously, the head has a compact rectangular shape with four corners and two main bits and two auxiliary bits alternatingly arranged in the four corners, with the auxiliary bits being arranged circumferentially in front of respective main bits in the rotational direction at an acute angle. Such a head is particularly suited for bore diameters from 4 to 18 mm.

Advantageously, the head may have in a plan view an X-shape with four corners and two concave sides, and two main bits and two auxiliary bits alternatingly arranged in the four corners, with the auxiliary bits being arranged circumferentially in front of respective main bits in the rotational direction at an acute angle. Such a head is particularly suited for bore diameters from 10 to 40 mm.

Alternatively, the head can have a shape of a cross (in plan view) with four corners and four main bits and four auxiliary bits alternatingly arranged in the four corners with the auxiliary bits being arranged circumferentially perpendicular to the main bits, whereby with the head being welded on the drill shaft, it is particularly suitable for bore diameters from 4 mm to 25 mm, and with the head being brazed on the drill shaft, the head is particularly suitable for bore diameters from 10 mm to 40 mm.

Advantageously, the solid hard material head is connected to an end of percussion drilling tool shaft in a material-locking manner, advantageously hard-brazed with bronze, which permits to obtain to a tool with an optimal service life.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
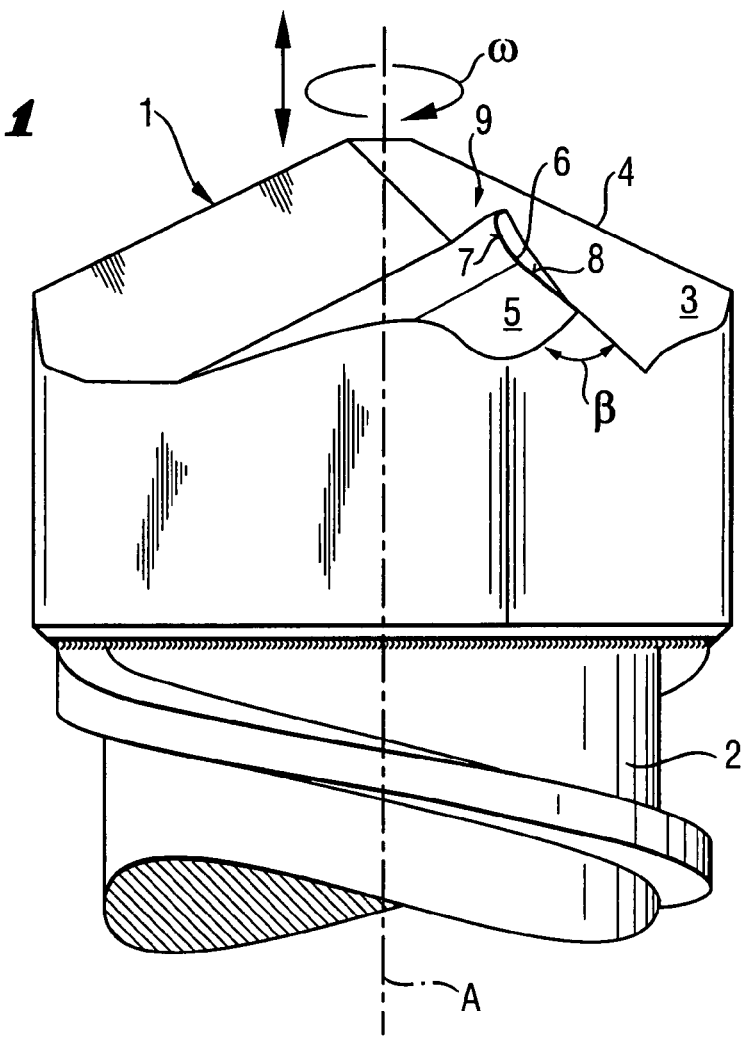
FIG. 1 a view along plane I-I in FIG. 2 of a percussion drilling tool according to the present invention.

A solid hard material head 1 according to the present invention is butt-brazed with bronze, as shown in FIG. 1, to an end 2 of a helical shaft of a percussion drilling tool rotatable about a rotational axis A in a rotational direction shown with arrow ω. The solid hard material head 1, hereinafter head, has main bits 3 each with a main cutting edge 4 and auxiliary bits 5 each with an auxiliary cutting edge 6. The auxiliary bits 5 are circumferentially offset relative to the main bits 3. The auxiliary cutting edges 6 are formed as circular arc sections 7 curved in a direction opposite the rotational direction ω. The circular arc section 7, which is spaced from the rotational axis A radially inwardly, is inclined in the radial direction, with the auxiliary cutting edge 6 forming, radially outwardly of the circular arc section 7, a straight outer section 8 extending radially outwardly. The auxiliary cutting edge 6 ends, radially inwardly at a distance from the rotational axis A, in an axial recess 9. The wedge angle β of the auxiliary bit 5, which is measured in a tangential plane, amounts to exactly 110°.

Figure 2:
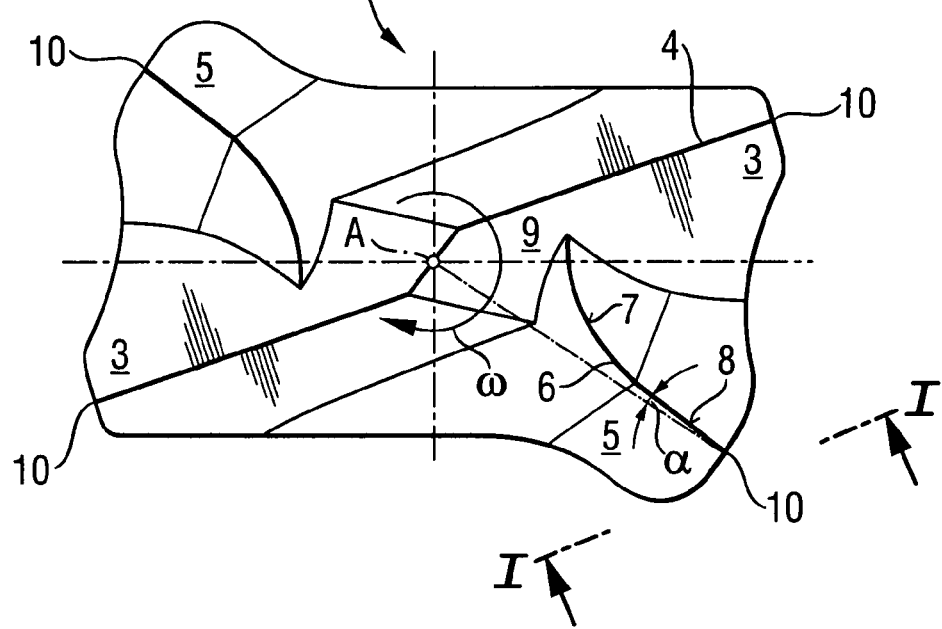
FIG. 2 a plan view of a first embodiment of a solid hard material head according to the present invention.

The head 1, which is shown in FIG. 2, has, in a plan view, a substantially rectangular shape with four corners 10. Alternatively, in the embodiment shown in FIG. 3, the head 1 is X-shaped and has essentially four corners 10 and two concave sides 11.

Figure 4:
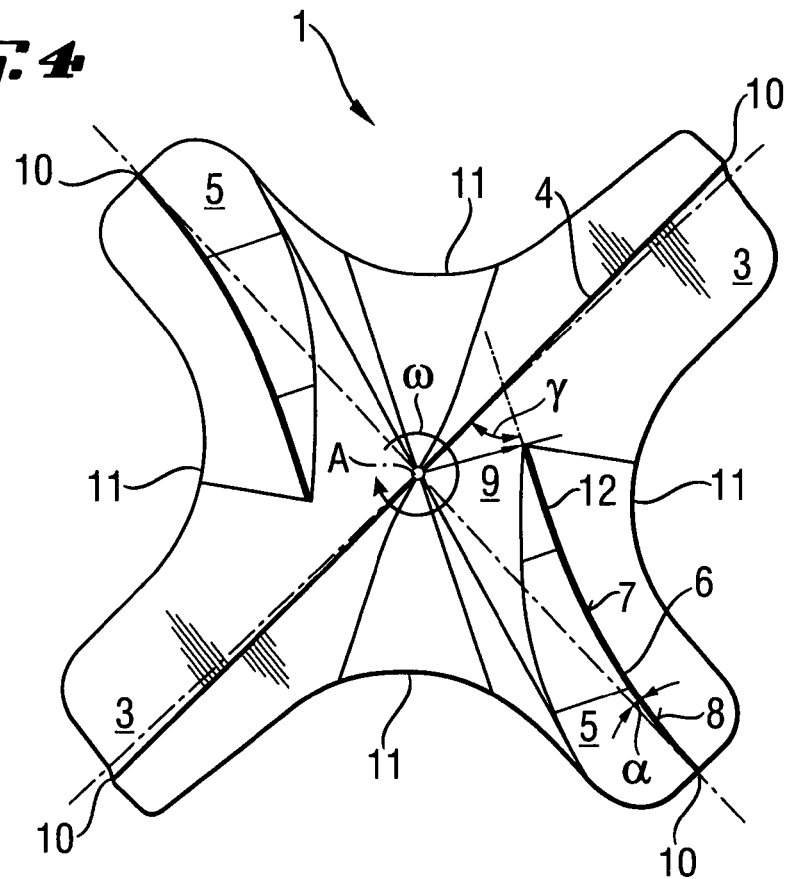
FIG. 4 a plan view of a third embodiment of a solid hard material head according to the present invention.

In another alternative embodiment shown in FIG. 4, the head 1 is cross-shaped and has four corners 10 and four concave sides 11. In this embodiment two main bits 3 and two auxiliary bits 5 are alternatingly arranged in the four corners 10.

Figure 3:
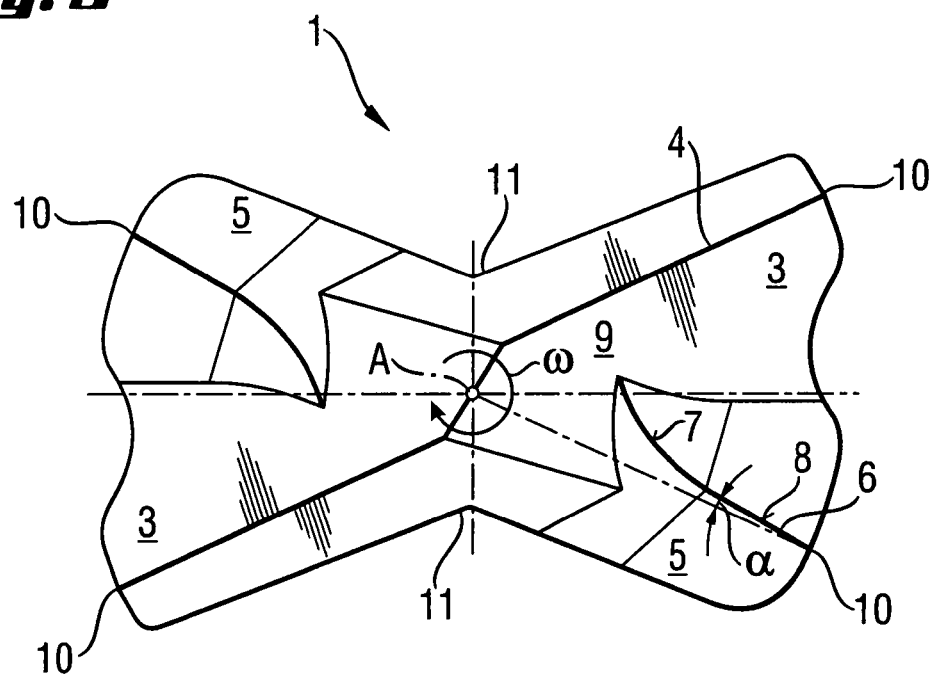
FIG. 3 a plan view of a second embodiment of a solid hard material head according to the present invention.

In the embodiments shown in FIGS. 2 and 3, the respective auxiliary bits 5 are arranged, in the rotational direction ω, circumferentially in front of the main bits 3 at an acute angle. In the embodiment shown in FIG. 4, the auxiliary bits 5 are arranged perpendicular to the main bits 3, so that the auxiliary cutting edges 6 form radially inward up to the axial recesses 6, respectively, straight inner sections 12.

As shown in FIGS. 2-3 and 4, in the course of the auxiliary cutting edge 6, the outer straight section 8 and the inner section 12 pass, respectively, into the circular arc section 7 smoothly, without any step, and are inclined over their entire course radially inwardly in the direction opposite rotational direction ω. The outer angle α of the straight outer section 8, which is measured in the axial plane with respect to a radius, amounts to exactly 5°.

In FIG. 4, an end angle 8 of the inner section 12, which is measured in the axial plane with respect to an associated main cutting edge 4, amounts to exactly 65°. As run-on ratio between a radial length of the axial recess 9 and the main cutting edge 4, which is measured in the axial plane, amounts to 0.25.

Though the present invention was shown and described with references to the preferred embodiments, such are merely illustrative of the present invention and is not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A solid hard material head for percussion drilling tool rotatable about a rotational axis (A) in a rotational direction (ω), the solid hard material head comprising at least one main bit (3) having a main cutting edge (4); and at least one auxiliary bit (5), circumferentially offset relative to the at least one main bit (3) and having an auxiliary cutting edge (6) formed, at least piecewise, as a circular arc section (7) spaced from the rotational axis (A) radially inwardly and inclined in a radial direction, the auxiliary cutting edge (6) having a straight outer section (8) extending radially outwardly with respect to the circular arc section (7) and inclined in the radial direction with respect to a radius at an angle (α) of from 2° to 15°.

2. A solid hard material head according to claim 1, wherein the auxiliary cutting edge (6) ends, radially inwardly at a distance from the rotational axis (A) in an axial recess (9).

3. A solid hard material head according to claim 2, wherein the auxiliary cutting edge (6) forms, radially inwardly, a straight inner section (12) extending up to the axial recess (9).

4. A solid hard material head according to claim 3, wherein an end angle (8) of the inner section (12) is in a range from 60° to 85°.

5. A solid hard material head according to claim 2, wherein a run-on ratio between a radial length of the axial recess (9) and the main cutting edge (4) is in range between 0.2 and 0.5.

6. A solid hard material head according to claim 1, wherein the straight outer section (8) and the circular arc section (7) smoothly pass into each other.

7. A solid hard material head according to claim 6, wherein the inner section (12) likewise smoothly passes into the circular arc section (7).

8. A solid hard material head according to claim 1, wherein the circular arc section (7) is curved in a direction opposite the rotational direction (ω).

9. A solid hard material head according to claim 1, wherein the straight outer section (8) and the circular arc section (7)

are inclined, along an entire course of the auxiliary cutting edge (6) radially inwardly in a direction opposite the rotational direction (ω).

10. A solid hard material head according to claim 9, wherein the inner section (12) is likewise inclined along an entire course of the auxiliary cutting edge (6) radially inwardly in a direction opposite the rotational direction (ω).

11. A solid hard material head according to claim 1, wherein a wedge angle (β) of the auxiliary bit (5) is in a range from 95° to 125°.

12. A solid hard material head according to claim 1, wherein the head has a compact rectangular shape with four corners (10), and wherein the head has two main bits and two auxiliary bits (5) alternatingly arranged in the four corners (10), and the auxiliary bits (5) are arranged circumferentially in front of respective main bits (3) in the rotational direction (ω) at an acute angle.

13. A solid hard material head according to claim 1, wherein the head has a X-shape with four corners (10) and two concave sides (11), and two main bits (5) and two auxiliary bits alternatingly arranged in the four corners (10) with the auxiliary bits (5) being arranged circumferentially in front of respective main bits (30) in the rotational direction (ω) at an acute angle.

14. A solid hard material, head according to claim 1, wherein the head has a shape of a cross with four corners (10) and four concave sides, and wherein the head has two main bits (3) and two auxiliary bits alternatingly arranged in four corners (10) and the auxiliary bits (5) extend perpendicular to the main bits (3).

15. A percussion drilling tool, comprising a shaft having an end (2); and a solid hard material head (10) connected to the shaft end (2) in a material-locking manner and including at least one main bit (3) having a main cutting edge (4), and at least one auxiliary bit (5), circumferentially offset relative to the at least one main bit (3) and having an auxiliary cutting edge (6) formed, at least piecewise, as a circular arc section (7) spaced from the rotational axis (A) radially inwardly and inclined in a radial direction, the auxiliary cutting edge further (5) having a straight outer section (8) extending radially outwardly with respect to the circular arc section (7) and inclined in the radial direction with respect to a radius at an angle (α) of from 2° to 15°.

* * * * *